(12) United States Patent
Tarango et al.

(10) Patent No.: US 10,795,593 B2
(45) Date of Patent: Oct. 6, 2020

(54) TECHNOLOGIES FOR ADJUSTING THE PERFORMANCE OF DATA STORAGE DEVICES BASED ON TELEMETRY DATA

(71) Applicant: Intel Corporation, Santa Clara, CA (US)

(72) Inventors: Joseph David Tarango, Longmont, CO (US); Jim Baca, Corrales, NM (US)

(73) Assignee: Intel Corporation, Santa Clara, CA (US)

( * ) Notice: Subject to any disclaimer, the term of this patent is extended or adjusted under 35 U.S.C. 154(b) by 40 days.

(21) Appl. No.: 16/125,901

(22) Filed: Sep. 10, 2018

(65) Prior Publication Data
US 2019/0042129 A1 Feb. 7, 2019

(51) Int. Cl.
G06F 3/06 (2006.01)
G06F 11/30 (2006.01)
G06F 11/34 (2006.01)

(52) U.S. Cl.
CPC ............ G06F 3/0632 (2013.01); G06F 3/067 (2013.01); G06F 3/0611 (2013.01); G06F 3/0653 (2013.01); G06F 11/3034 (2013.01); G06F 11/3051 (2013.01); G06F 11/3433 (2013.01)

(58) Field of Classification Search
CPC .... G06F 3/0611; G06F 3/0629; G06F 3/0632; G06F 3/0634; G06F 3/0653; G06F 3/067; G06F 11/3034; G06F 11/3051; G06F 11/3433
USPC ....................................................... 711/154
See application file for complete search history.

(56) References Cited

U.S. PATENT DOCUMENTS

| 9,454,321 | B1 * | 9/2016 | Smaldone | G06F 3/061 |
| 9,983,795 | B1 * | 5/2018 | Naamad | G06F 3/061 |
| 2010/0312977 | A1 * | 12/2010 | Yim | G06F 8/4441 |
| | | | | 711/162 |
| 2011/0145918 | A1 * | 6/2011 | Jung | G06F 3/0622 |
| | | | | 726/22 |
| 2012/0124319 | A1 * | 5/2012 | Kirvan | G06F 3/061 |
| | | | | 711/170 |

(Continued)

OTHER PUBLICATIONS

H. Midorikawa and H. Tan, "Locality-Aware Stencil Computations Using Flash SSDs as Main Memory Extension," 2015 15th IEEE/ACM International Symposium on Cluster, Cloud and Grid Computing, Shenzhen, 2015, pp. 1163-1168, doi: 10.1109/CCGrid.2015.126. (Year: 2015).*

(Continued)

*Primary Examiner* — Reginald G Bragdon
*Assistant Examiner* — Aaron D Ho
(74) *Attorney, Agent, or Firm* — Barnes & Thornburg LLP

(57) ABSTRACT

Technologies for adjusting the performance of data storage devices based on telemetry data include a compute device with a compute engine. The compute engine is configured to receive, with communication circuitry and through a network, telemetry data indicative of a present configuration and performance of each of multiple data storage devices, determine, as a function of the received telemetry data, a replacement configuration to improve the performance of one or more of the data storage devices, and send, with the communication circuitry, responsive data that is usable by the one or more of the data storage devices to improve the performance of the one or more data storage devices.

17 Claims, 11 Drawing Sheets

(56) References Cited

U.S. PATENT DOCUMENTS

| | | | | |
|---|---|---|---|---|
| 2012/0233609 | A1* | 9/2012 | Blythe | G06F 11/3419 |
| | | | | 718/1 |
| 2014/0245274 | A1* | 8/2014 | Inoue | G06F 8/4443 |
| | | | | 717/151 |
| 2015/0332048 | A1* | 11/2015 | Mooring | G06F 21/567 |
| | | | | 726/1 |
| 2016/0098225 | A1* | 4/2016 | Huang | G06F 3/0635 |
| | | | | 711/154 |
| 2016/0170665 | A1* | 6/2016 | Alatorre | G06F 3/0605 |
| | | | | 711/154 |
| 2018/0113640 | A1* | 4/2018 | Fernandez | G06F 3/0634 |
| 2018/0211046 | A1* | 7/2018 | Muttik | G06F 21/566 |
| 2018/0260242 | A1* | 9/2018 | Ahmed | G06F 11/3006 |
| 2019/0102312 | A1* | 4/2019 | McDonnell | G06F 12/0837 |
| 2019/0163586 | A1* | 5/2019 | McBride | G06F 3/0647 |
| 2019/0235765 | A1* | 8/2019 | Crawford | G06F 3/067 |
| 2019/0319839 | A1* | 10/2019 | Nozhchev | G06F 11/3409 |

OTHER PUBLICATIONS

J. Weinberg, M. O. McCracken, E. Strohmaier and A. Snavely, "Quantifying Locality in the Memory Access Patterns of HPC Applications," SC '05: Proceedings of the 2005 ACM/IEEE Conference on Supercomputing, Seattle, WA, USA, 2005, pp. 50-50, doi : 10.1109/SC.2005.59. (Year: 2005).*

* cited by examiner

TECHNOLOGIES FOR ADJUSTING THE PERFORMANCE OF DATA STORAGE DEVICES BASED ON TELEMETRY DATA

BACKGROUND

Data storage devices are typically manufactured and sold to customers with a configuration that provides a baseline level of performance for a wide range of potential workloads (e.g., a set of operations, including data access operations, performed by a compute device executing a software application). It is possible for the configuration to require that certain functions be performed by a storage device even when those functions are of little benefit in certain usage scenarios (e.g., performing encryption and decryption algorithms on non-sensitive data, pre-fetching data sets that are not subsequently used, etc.). The usage of the data storage devices may be unknown to the manufacturer of the data storage devices unless the manufacturer affirmatively asks each customer about their usage of the data storage devices. Further, when a data storage device becomes inoperative (e.g., due to a malfunctioning component), the customer is typically required to expend the time and cost of physically sending the inoperative data storage device to the manufacturer to enable the manufacturer to study the data storage device and potentially recover the customer's otherwise inaccessible data from it.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
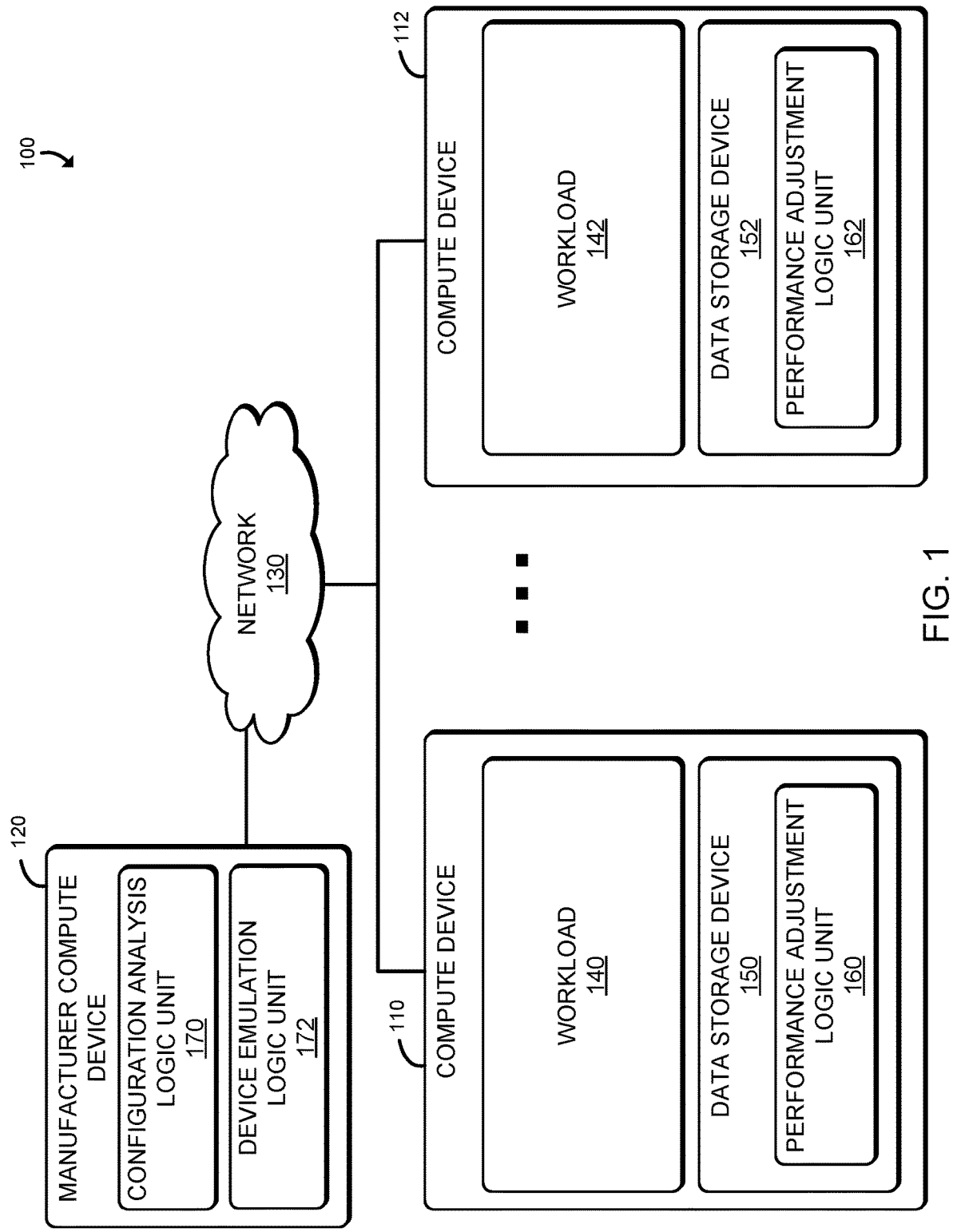
FIG. 1 is a simplified diagram of at least one embodiment of a system for adjusting the performance of data storage devices based on telemetry data.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for adjusting the performance of data storage devices based on telemetry data includes a set of compute devices 110, 112 in communication with a manufacturer compute device 120 (e.g., a compute device used by a manufacturer of the data storage devices) through a network 130. The compute devices 110, 112, in the illustrative embodiment, are located in a data center (e.g., a cloud data center) and execute workloads 140, 142 (e.g., sets of operations, such as applications, in virtual machines or containers) on behalf of a customer (not shown). The workloads 140, 142, in operation, may request data from and store data to a corresponding data storage device 150, 152 in each compute device 110, 112. While two compute devices 110, 112 and two data storage devices 150, 152 are shown for simplicity, it should be understood that in the illustrative embodiment, the number of compute devices and data storage devices in the system 100 may number in the tens, hundreds, thousands, millions, or more across many data centers (e.g., data centers operated by different customers). One workload (e.g., the workload 140) may request only a subset of the available data access operations that the data storage device 150 is capable of performing and/or may exhibit a particular pattern in requesting access to data available on the data storage device 150. For example, the workload 140 may utilize one of a set of available error correction algorithms and/or encryption algorithms that the data storage device 150 is capable of performing and may typically read relatively large data files (e.g., for media streaming), while the workload 142 may utilize a different set of available error correction algorithms and/or encryption algorithms that the data storage device 152 is capable of performing, and may exhibit a different pattern of data access (e.g., reading smaller data sets and writing to the data storage device 150 more frequently than the workload 140 writes to the data storage device 150). Further, the data storage devices 150, 152 produce telemetry data (e.g., data indicative of the present configuration of each data storage device 150, 152 and the present performance of each data storage device 150, 152, such as speeds at which operations are performed, malfunctions of one or more components, etc.) that is sent by each corresponding compute device 110, 112 through the network 130 to the manufacturer compute device 120 for analysis (e.g., data mining). In performing the data mining, the manufacturer compute device 120 may utilize a configuration analysis logic unit 170, which may be embodied as any device or circuitry (e.g., a processor, an integrated circuit, etc.) or software configured to compare configurations from many different data storage devices to identify configurations that provide the best (e.g., fastest) performance for each of multiple types of workloads and may utilize a device emulation logic unit 172, which may be embodied as any device or circuitry (e.g., a processor, an integrated circuit, etc.) or software configured to emulate, using the configuration provided in the received telemetry data, one of the data storage devices to address component malfunctions, recover data, or perform other analysis without requiring the data storage device to be physically provided to the manufacturer.

In the illustrative embodiment, each data storage device 150, 152 includes a corresponding performance adjustment logic unit 160, 162, which may be embodied as software or circuitry (e.g., a co-processor, a microcontroller, an application specific integrated circuit (ASIC), a field programmable gate array (FPGA), etc.) configured to learn the usage patterns (e.g., requests from the corresponding workload 140, 142) and modify features of the data storage device 150, 152 to more efficiently serve the needs of the workload 140, 142. For example, each performance adjustment logic unit 160, 162 may modify executable code to disable checks that would otherwise be performed to monitor whether certain components (e.g., hardware and/or software) are functioning properly if those components are not used by the corresponding workload 140, 142 (e.g., to reduce boot times for the data storage devices 150, 152), reorganize executable code to move frequently used functions closer together in the memory of the data storage device 150, 152 to reduce the amount of time needed by a data storage controller in each corresponding data storage device 150, 152 to access and execute the executable code, relocate and/or distribute data sets within the data storage device 150, 152 to reduce latency in accessing the data sets, and enable and/or adjust data prefetching operations. The telemetry data sent to the manufacturer compute device 120 indicates these adjustments to the configuration of each data storage device 150, 152 and the corresponding performance of each data storage device 150, 152 and, using that telemetry data, the manufacturer compute device 120 determines which configuration provides the best performance (e.g., fastest execution of operations) for a given type of workload (e.g., use case) and sends the best configuration(s) to the compute devices 110, 112 for use with the data storage devices 150, 152. As such, while each individual data storage device 150, 152 may iteratively improve its performance through continual adjustments, the manufacturer compute device 120, by comparing configurations from many different data storage devices may identify better configurations faster than the data storage devices 150, 152 working individually, would identify them. Furthermore, by locally emulating a data storage device that has become inoperative (e.g., due to a malfunctioning component), the manufacturer compute device 120 may enable support staff at the manufacturer to determine a set of steps (e.g., executable instructions) to recover data from the data storage device and send the executable instructions back to the data storage device for execution.

Figure 2:
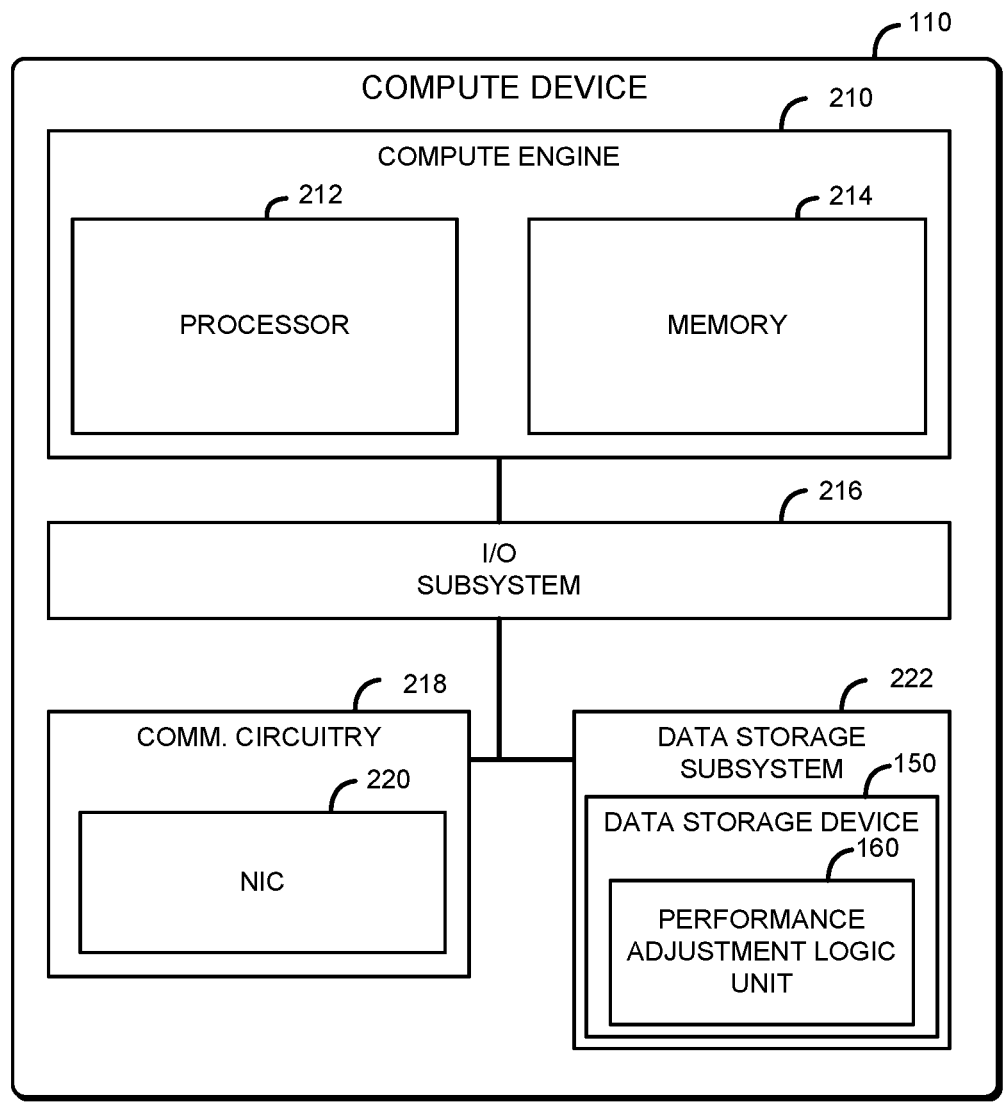
FIG. 2 is a simplified block diagram of at least one embodiment of a compute device included in the system of FIG. 1.

Referring now to FIG. 2, the illustrative compute device 110 includes a compute engine (also referred to herein as "compute engine circuitry") 210, an input/output (I/O) subsystem 216, communication circuitry 218, and a data storage subsystem 222. Of course, in other embodiments, the compute device 110 may include other or additional components, such as those commonly found in a computer (e.g., a display, peripheral devices, etc.). Additionally, in some embodiments, one or more of the illustrative components may be incorporated in, or otherwise form a portion of, another component. The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. In the illustrative embodiment, the compute engine 210 includes or is embodied as a processor 212 and a memory 214. The processor 212 may be embodied as any type of processor capable of performing the functions described herein. For example, the processor 212 may be embodied as a multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein.

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 214 may be integrated into the processor 212. In operation, the main memory 214 may store various software and data used during operation such as applications, libraries, and drivers.

The compute engine 210 is communicatively coupled to other components of the compute device 110 via the I/O subsystem 216, which may be embodied as circuitry and/or components to facilitate input/output operations with the compute engine 210 (e.g., with the processor 212 and/or the main memory 214) and other components of the compute device 110. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the compute device 110, into the compute engine 210.

The communication circuitry 218 may be embodied as any communication circuit, device, or collection thereof, capable of enabling communications over the network 130 between the compute device 110 and another compute device (e.g., the manufacturer compute device 120, etc.). The communication circuitry 218 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 218 includes a network interface controller (NIC) 220, which may also be referred to as a host fabric interface (HFI). The NIC 220 may be embodied as one or more add-in-boards, daughter cards, network interface cards, controller chips, chipsets, or other devices that may be used by the compute device 110 to connect with another compute device (e.g., the manufacturer compute device 120, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the compute device 110 at the board level, socket level, chip level, and/or other levels.

The data storage subsystem 222 may be embodied as a set of one or more data storage devices. In the illustrative embodiment, the data storage subsystem 222 includes the data storage device 150, which may be embodied as any type of device configured for short-term or long-term storage of data such as, for example, memory devices and circuits, memory cards, hard disk drives, solid-state drives, or other data storage device. The data storage device 150 may include a system partition that stores data and firmware code for the data storage device 150 and configuration data for features of the data storage device 150. The data storage device 150 may also include one or more operating system partitions that store data files and executables for operating systems. Additionally, in the illustrative embodiment, the data storage device 150 includes the performance adjustment logic unit 160 described with reference to FIG. 1.

The compute device 112 may have components similar to those described in FIG. 2 with reference to the compute device 110. The description of those components of the compute device 110 is equally applicable to the description of components of the compute device 112. Further, it should be appreciated that any of the compute devices 110, 112 may include other components, sub-components, and devices commonly found in a computing device, which are not discussed above in reference to the compute device 110 and not discussed herein for clarity of the description.

As described above, the compute devices 110, 112 and the manufacturer compute device 120 are illustratively in communication via the network 130, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), a radio area network (RAN), digital subscriber line (DSL) networks, cable networks (e.g., coaxial networks, fiber networks, etc.), or any combination thereof.

Figure 3:
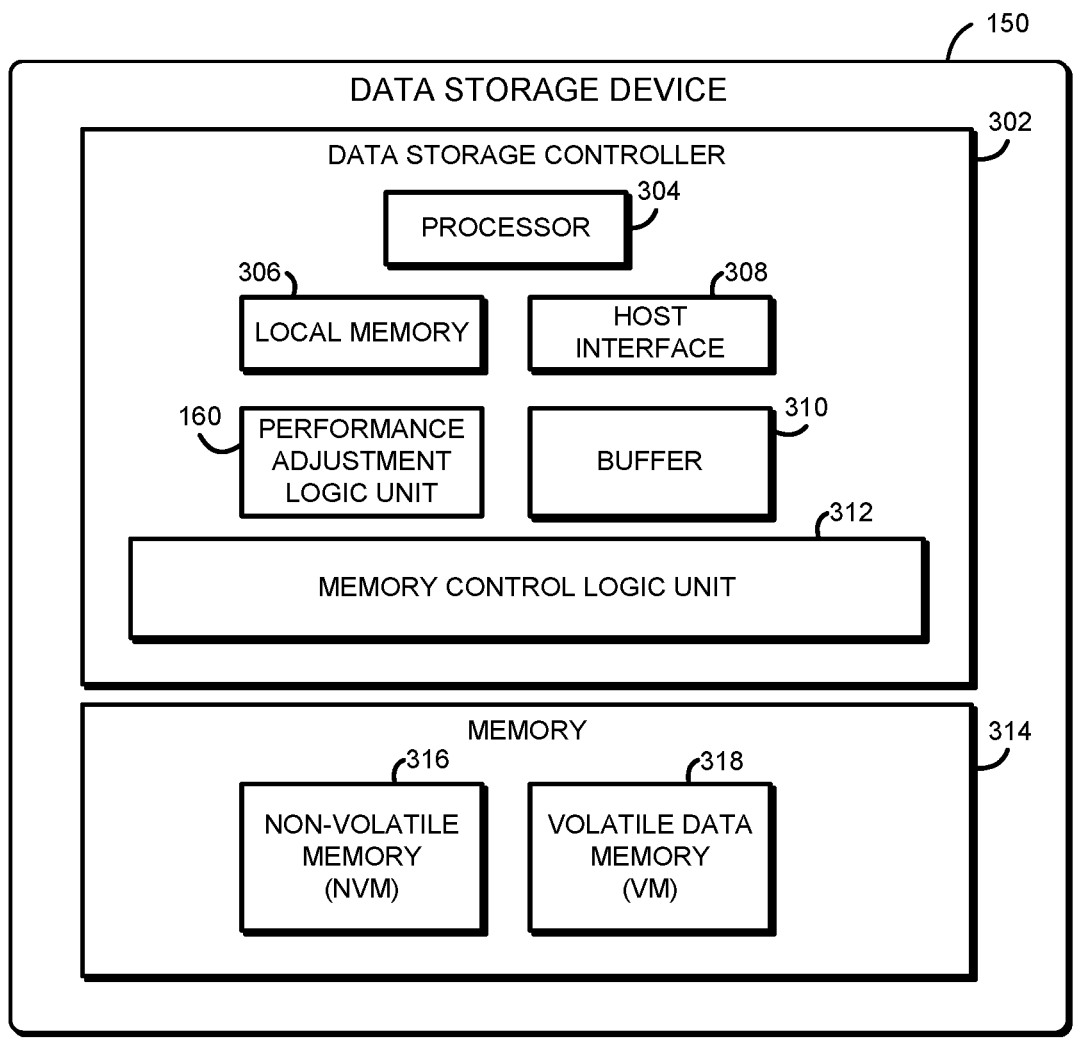
FIG. 3 is a simplified block diagram of at least one embodiment of a data storage device included in a compute device of the system of FIG. 1.

Referring now to FIG. 3, in the illustrative embodiment, the data storage device 150 includes the data storage controller 302 and a memory 314, which illustratively includes a non-volatile memory 316 and a volatile memory 318. The data storage controller 302 may be embodied as any type of control device, circuitry or collection of hardware devices capable of selectively reading from and/or writing to the memory 314 (e.g., in response to requests from a host device, such as the compute device 110) and performing related operations in the process of reading and/or writing the data (e.g., pre-fetching data before that data is requested by the host, performing error correction operations on data, encrypting or decrypting data, etc.), as well as learning the usage patterns of a workload (e.g., the workload 140) and adjusting features of the data storage device 150 to more efficiently (e.g., with lower latency) serve the needs of the workload, as described in more detail herein. In the illustrative embodiment, the data storage controller 302 includes a processor (or processing circuitry) 304, a local memory 306, a host interface 308, the performance adjustment logic unit 160, a buffer 310, and a memory control logic unit 312. In some embodiments, the processor 304, memory control logic unit 312, and the memory 306, 314 may be included in a single die or integrated circuit. Of course, the data storage controller 302 may include additional devices, circuits, and/or components commonly found in a controller of a data storage device in other embodiments.

The processor 304 may be embodied as any type of processor capable of performing the functions disclosed herein. For example, the processor 304 may be embodied as a single or multi-core processor(s), digital signal processor, microcontroller, or other processor or processing/controlling circuit. Similarly, the local memory 306 may be embodied as any type of volatile and/or non-volatile memory or data storage capable of performing the functions disclosed herein. In the illustrative embodiment, the local memory 306 stores firmware and/or instructions executable by the processor 304 to perform the described functions of the data storage controller 302. In some embodiments, the processor 304 and the local memory 306 may form a portion of a System-on-a-Chip (SoC) and be incorporated, along with other components of the data storage controller 108, onto a single integrated circuit chip.

The host interface 308 may also be embodied as any type of hardware processor, processing circuitry, input/output circuitry, and/or collection of components capable of facilitating communication of the data storage device 150 with a host device (e.g., the compute device 110) or service (e.g., the workload 140). That is, the host interface 308 embodies or establishes an interface for accessing data stored on the data storage device 150 (e.g., stored in the memory 314). To do so, the host interface 308 may be configured to use any suitable communication protocol and/or technology to facilitate communications with the data storage device 150 depending on the type of data storage device. For example, the host interface 308 may be configured to communicate with a host device or service using Serial Advanced Technology Attachment (SATA), Peripheral Component Interconnect express (PCIe), Serial Attached SCSI (SAS), Universal Serial Bus (USB), and/or other communication protocol and/or technology in some embodiments.

The buffer 310 may be embodied as volatile memory used by the data storage controller 302 to temporarily store data that is being read from or written to the memory 314. The particular size of the buffer 310 may be dependent on the total storage size of the memory 314. The memory control logic unit 312 is illustratively embodied as hardware circuitry and/or devices (e.g., a processor, an ASIC, etc.) configured to control the read/write access to data at particular storage locations of the memory 314.

The non-volatile memory 316 may be embodied as any type of data storage capable of storing data in a persistent manner (even if power is interrupted to non-volatile memory 316). For example, in the illustrative embodiment, the non-volatile memory 316 is embodied as a set of multiple non-volatile memory devices. The non-volatile memory devices of the non-volatile memory 316 are illustratively embodied as NAND Flash memory devices. However, in other embodiments, the non-volatile memory 316 may be additionally or alternatively include any combination of memory devices that use chalcogenide phase change material (e.g., chalcogenide glass), three-dimensional (3D) crosspoint memory, or other types of byte-addressable, write-in-place non-volatile memory, ferroelectric transistor random-access memory (FeTRAM), nanowire-based non-volatile memory, phase change memory (PCM), memory that incorporates memristor technology, Magnetoresistive random-access memory (MRAM) or Spin Transfer Torque (STT)-MRAM. The volatile memory 318 may be embodied as any type of data storage device or devices capable of storing data while power is supplied to the volatile memory 318, similar to the memory 214 described with reference to FIG. 2. For example, in the illustrative embodiment, the volatile memory 318 is embodied as one or more dynamic random-access memory (DRAM) devices.

Figure 4:
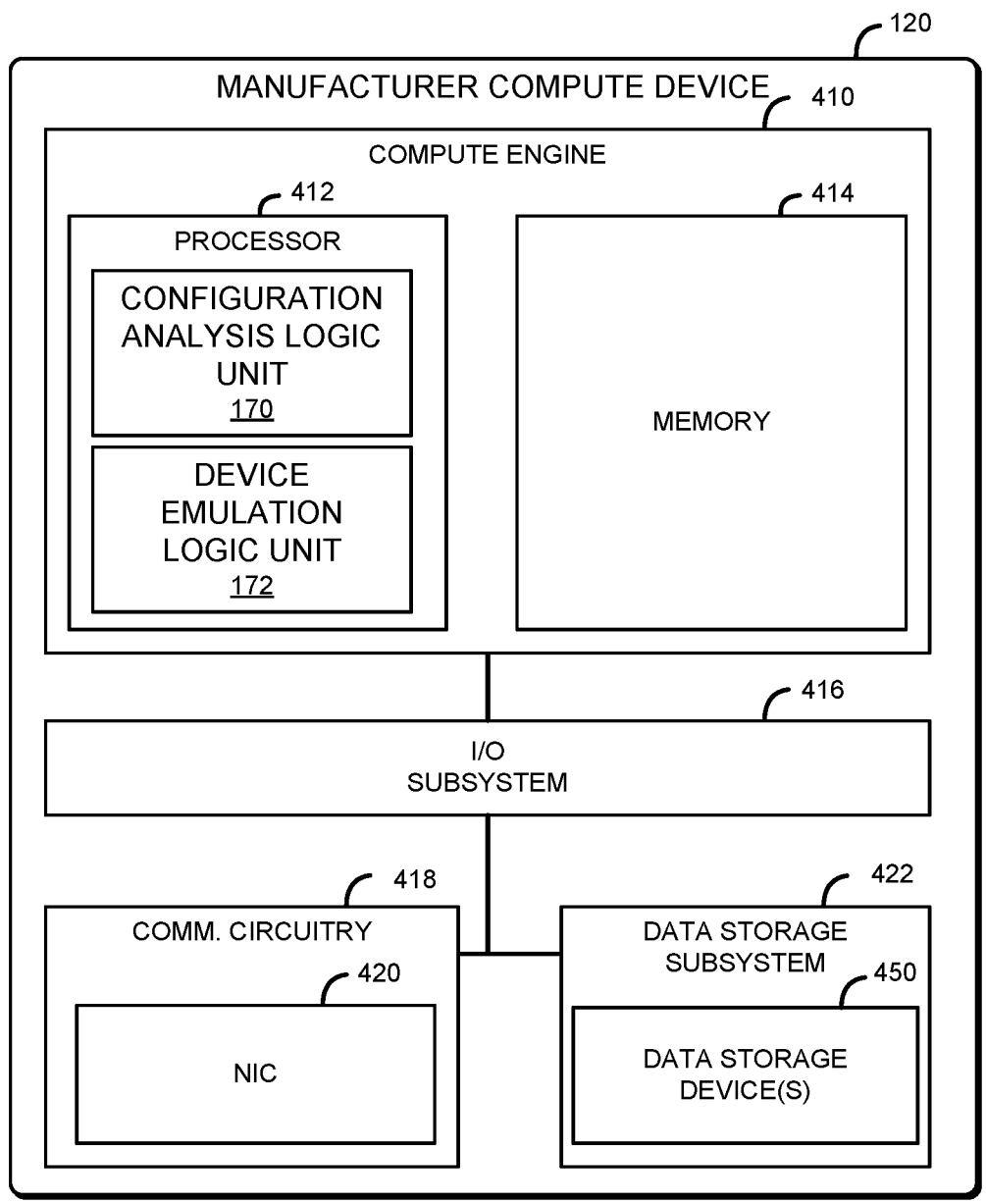
FIG. 4 is a simplified block diagram of at least one embodiment of a manufacturer compute device included in the system of FIG. 1.

Referring now to FIG. 4, the illustrative manufacturer compute device 120 includes a compute engine (also referred to herein as "compute engine circuitry") 410, an input/output (I/O) subsystem 416, communication circuitry 418, and a data storage subsystem 422. Of course, in other embodiments, the manufacturer compute device 120 may include other or additional components, such as those commonly found in a computer (e.g., a display, peripheral devices, etc.). Additionally, in some embodiments, one or more of the illustrative components may be incorporated in, or otherwise form a portion of, another component. The compute engine 410 is similar to the compute engine 210 of FIG. 2, and includes a processor 412, similar to the processor 212 and a memory 414, similar to the memory 414. However, unlike the processor 212, the processor 412, in the illustrative embodiment, includes the configuration analysis logic unit 170 and the device emulation logic unit 172, described with reference to FIG. 1. Further, the I/O subsystem 416, the communication circuitry 418, the network interface controller (NIC) 420, the data storage subsystem 422, and the data storage device 450 are similar to the communication circuitry 218, NIC 220, data storage subsystem 222, and data storage device 150, described above with reference to FIGS. 1-3. Though shown as a single unit, it should be understood that in some embodiments, the components of the manufacturer compute device 120 may be disaggregated (e.g., located in different racks, different portions of a data center, etc.).

Figure 5:
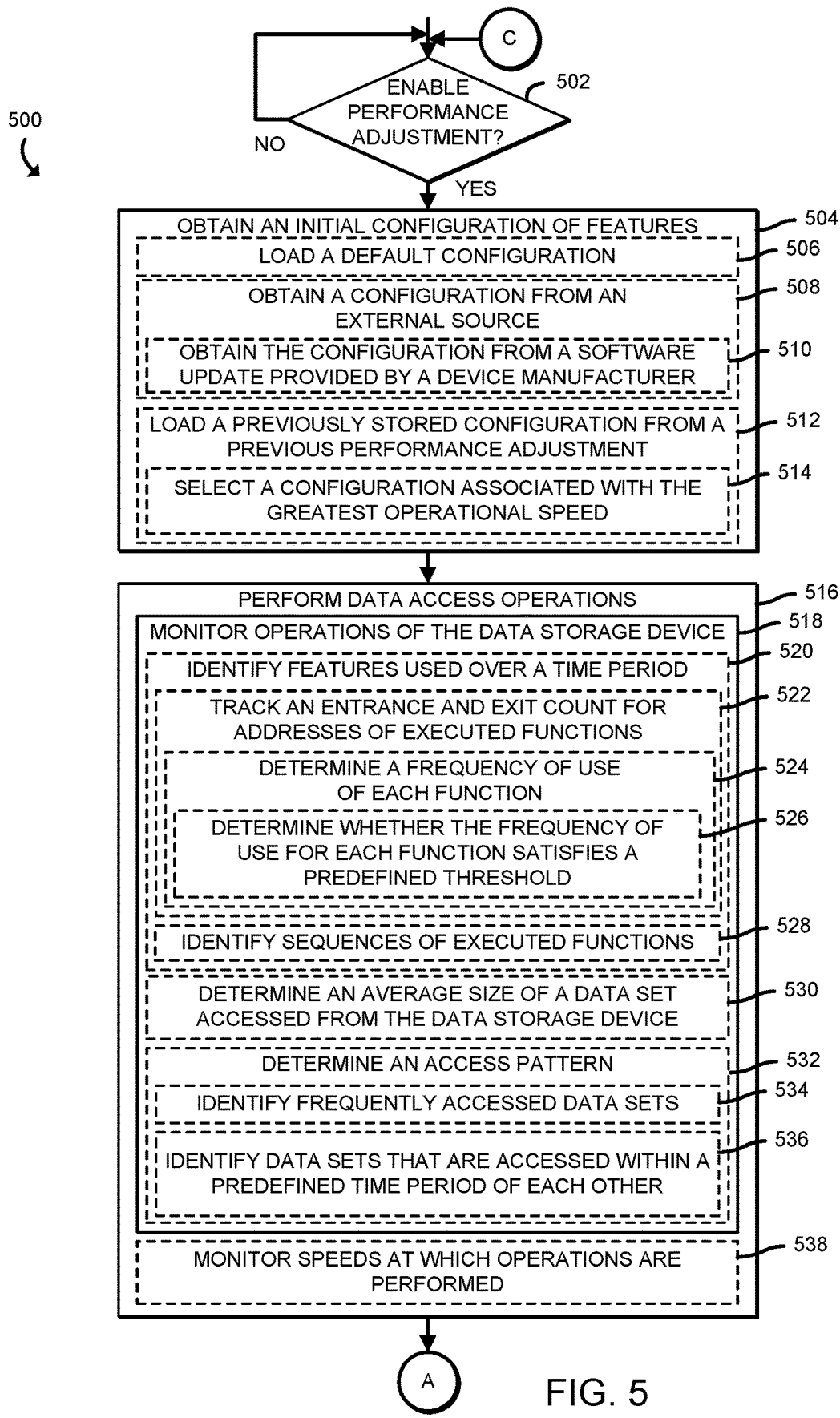
FIGS. 5-7 are a simplified block diagram of at least one embodiment of a method for providing dynamic performance adjustment that may be executed by the data storage device of FIG. 3.

Referring now to FIG. 5, a data storage device of a compute device in the system 100 (e.g., the data storage device 150 of the compute device 110), in operation, may execute a method 500 for dynamically adjusting the performance of the data storage device 150 to more efficiently serve the needs of a workload (e.g., the workload 140) executed by the compute device 110. The method 500 begins with block 502 in which the data storage device 150 determines whether to enable dynamic performance adjustment. In the illustrative embodiment, the data storage device 150 may determine to enable dynamic performance adjustment in response to a determination that the performance adjustment logic unit 160 is present, in response to a request (e.g., from a host device, such as the compute device 110), and/or based on other criteria. Regardless, in response to a determination to enable dynamic performance adjustment, the method 500 advances to block 504, in which the data storage device 150 obtains an initial configuration of features. In doing so, and as indicated in block 506, the data storage device 150 may load a default configuration (e.g., a configuration provided to the data storage device 150 at the time of manufacture) from the memory 314.

As indicated in block 508, the data storage device 150 may obtain a configuration from an external source (e.g., from outside of the data storage device 150). For example, and as indicated in block 510, the data storage device 150 may obtain a configuration from a software update provided by a manufacturer of the data storage device 150 (e.g., a software update sent from the manufacturer compute device 120 to the compute device 110 through the network 130). The software update may be provided in a set of telemetry packets 1100, examples of which are described with reference to FIG. 11. In some embodiments, the configuration from the software update may include executable instructions to enable the data storage device 150 to operate (e.g., access otherwise inaccessible data) when one or more components (e.g., hardware and/or software code blocks) of the data storage device 150 is malfunctioning (e.g., inoperative). For example, the executable instructions may define an alternative method to access data without utilizing the malfunctioning component. Alternatively, and as indicated in block 512, the data storage device 150 may load a previously stored configuration from a previous performance adjustment (e.g., a previous execution of the method 500). In doing so, the data storage device 150 may select one configuration from a set of configurations stored in the memory 314 based on operational speed data (e.g., data indicative of measured amounts of time taken by the data storage device 150 to perform a set of data access operations under the corresponding configuration), as indicated in block 514. In doing so, in the illustrative embodiment, the data storage device 150 selects the configuration associated with the greatest operational speed.

Subsequently, in block 516, the data storage device 150 performs data access operations (e.g., reading and/or writing data sets in response to requests from the processor 212 as the compute device 110 executes the workload 140). In doing so, the data storage device 150 monitors aspects of the operations it performs, as indicated in block 518. For example, and as indicated in block 520, the data storage device 150 identifies features (e.g., available functions of the data storage device 150, such as encryption/decryption, error correction algorithms, etc.) over a time period (e.g., until the data storage device is powered down). In the illustrative embodiment, the data storage device 150 may track an entrance and exit count for addresses (e.g., in the memory 306 or 314) of functions executed by the data storage device (e.g., by the data storage controller 302), indicating the number of times each function is executed by the data storage device 150 during the time period, as indicated in block 522. As indicated in block 524, in the illustrative embodiment, the data storage device 150 determines a frequency of use of each function. Further, and as indicated in block 526, the data storage device 150 determines whether the frequency of use for each function satisfies a predefined threshold (e.g., determines which functions were executed at least once during the time period).

As indicated in block 528, the data storage device 150, in the illustrative embodiment, also identifies sequences (e.g., paths) of executed functions (e.g., function A is executed, then function C, then function F, then function D). In monitoring the operations, the data storage device 150 may additionally determine an average size of a data set accessed from the data storage device 150 (e.g., from the memory 314), as indicated in block 530. For example, a workload that streams data such as media files may read relatively large data sets from the memory 314 compared to a workload that performs user authentication operations (e.g., for a website). Similarly, the data storage device 150 may determine a data access pattern associated with the operations performed on behalf of the workload 140, as indicated in block 532. In doing so, the data storage device 150 may identify data sets that are accessed with a predefined frequency (e.g., at least once per second), as indicated in block 534. Additionally or alternatively, the data storage device 150 may identify data sets that are accessed within a predefined period of each other (e.g., the data storage device 150 typically accesses data set B within 10 milliseconds of accessing data set A), as indicated in block 536. Further, in the illustrative embodiment, the data storage device 150 monitors the speeds at which the operations are performed (e.g., an amount of time taken to perform each operation), as indicated in block 538. The method 500 continues on in block 540 of FIG. 6, in which the data storage device 150 determines, as a function of the monitored operations (e.g., the monitored usage of the data storage device 150 by the workload 140), an adjustment to the configuration (e.g., the configuration obtained in block 504) to accelerate the performance of the data storage device 150 (e.g., to reduce the amount of time taken to perform one or more operations).

Figure 6:
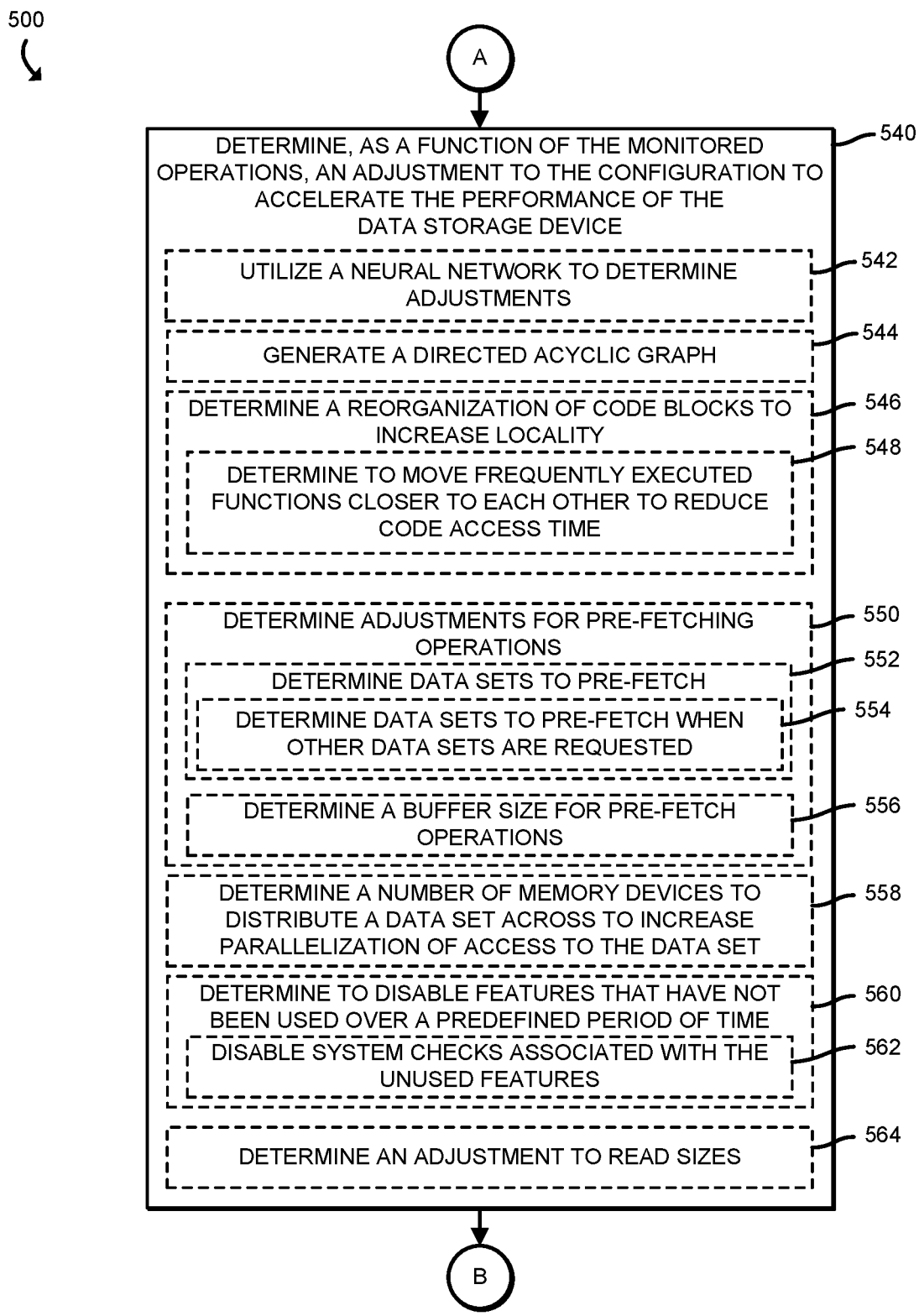

Referring now to FIG. 6, in determining the adjustment, the data storage device 150 may utilize a neural network (e.g., determine a difference between an expected set of results predicted by the neural network, such as the features of the data storage device 150 that were used and the speed at which operations were performed, and the actual monitored results, to determine adjustments to one or more settings), as indicated in block 542. The data storage device 150 may also generate a directed acyclic graph (e.g., a data structure indicating paths between nodes, which may be indicative of sequences of data sets accessed by the data storage device 150 and/or functions executed by the data storage device 150 during the time period that the operations were monitored in block 518 of FIG. 5), as indicated in block 544. The data storage device 150 may also determine a reorganization of code blocks (e.g., sets of code that define functions) to increase their locality, as indicated in block 546. For example, and as indicated in block 548, the data storage device 150 may determine to move frequently executed functions (e.g., a set of functions that were executed more than a predefined number of times) closer to each other in the memory 314 to reduce the amount of time needed by the data storage device 150 to access the code for each of those functions in the future.

The data storage device 150 may additionally or alternatively determine adjustments for data prefetching operations, as indicated in block 550. For example, the data storage device 150 may determine data sets that should be prefetched (e.g., read into a buffer before the workload 140 requests the data set(s)), as indicated in block 552. In doing so, the data storage device 150 may determine one or more data sets to prefetch when another data set has been requested by the workload 140 (e.g., because those data sets are often accessed within a relatively short period of time of each other), as indicated in block 554. Similarly, the data storage device 150 may determine a size of a buffer to be used in prefetch operations (e.g., to enable prefetching of a complete data set that is likely to be requested, rather than only a portion of that data set), as indicated in block 556. As indicated in block 558, the data storage device 150 may determine a number a memory devices (e.g., NAND devices) to distribute a data set across to increase parallelization of access to the data set (e.g., by concurrently reading parts of a total data set from different non-volatile memory devices in the non-volatile memory 316, the data storage device 150 may provide the complete data set to the workload 140 faster than if the entire data set was read from a single non-volatile memory device).

Additionally or alternatively, the data storage device 150 may determine to disable one or more features that were not used by the workload 140, as indicated in block 560. In doing so, the data storage device 150, in the illustrative embodiment, also disables any system checks (e.g., to determine whether components associated with those disabled features are operative) associated with those unused features, as indicated in block 562. Doing so may reduce the amount of code executed by the data storage device during a boot sequence and/or during data access operations (e.g., the data storage device 150 will no longer spend time determining whether a requested data set should be decrypted before sending it to the workload 140 because the cryptography functions of the data storage device 150 were not used by the workload 140 in the past and, accordingly, have been disabled). The data storage device may also determine an adjustment to read sizes (e.g., the workload historically requests data sets that are smaller than a default read size defined in the configuration), as indicated in block 564. Subsequently, the method 500 advances to block 566 of FIG. 7, in which the data storage device 150 applies the determined adjustment to the configuration.

Figure 7:
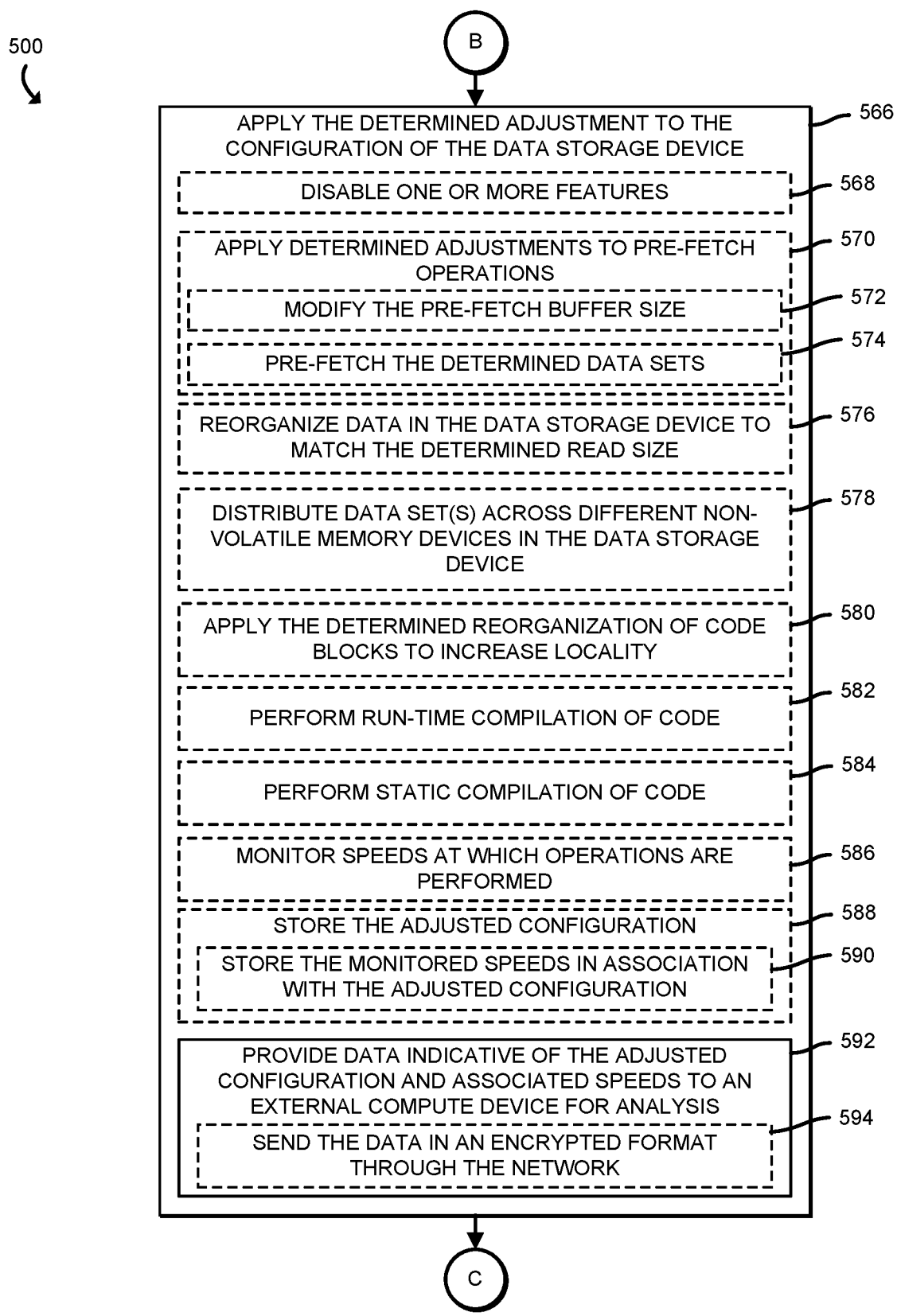

Referring now to FIG. 7, in applying the determined adjustment, the data storage device may disable one or more features (e.g., the feature(s) determined in block 560), as indicated in block 568. Additionally or alternatively, the data storage device 150 may apply determined adjustments to prefetch operations, as indicated in block 570. In doing so, the data storage device 150 may modify the buffer size used for prefetch operations, as indicated in block 572 and may prefetch certain data sets that were identified (e.g., in block 552) for prefetching, as indicated in block 574. The data storage device 150 may additionally or alternatively reorganize data (e.g., relocate portions of data sets to be contiguous) to match the determined read size (e.g., from block 564), as indicated in block 576. As indicated in block 578, the data storage device 150 may distribute data set(s) across multiple non-volatile memory devices (e.g., in the non-volatile memory 316) to increase parallelism of data accesses, as described with reference to block 558 of FIG. 5. The data storage device 150 may also apply the determined reorganization of code blocks to increase the locality of the code blocks (e.g., move code blocks defining frequently used functions closer to each other in memory), as indicated in block 580. In some embodiments, the data storage device 150 may perform run-time (e.g., dynamic) compilation of code to apply the changes to the configuration (e.g., to remove jumps to disabled features, to update addresses for functions that have been moved closer to each other, etc.), as indicated in block 582.

In other embodiments, the data storage device 150 may perform static compilation, as indicated in block 584. As such, in some embodiments, the data storage device 150 may restart before performing any data access operations under the adjusted configuration. Regardless, as indicated in block 586, the data storage device 150 monitors speeds at which the data storage device 150 performs operations for the workload 140 under the adjusted configuration. As indicated in block 588, the data storage device 150 stores the adjusted configuration (e.g., in the non-volatile memory 316). In doing so, and as indicated in block 590, the data storage device 150 stores the monitored speeds in association with the adjusted configuration (e.g., to enable the data storage device 150 to determine which stored configuration provides the greatest speed in a subsequent execution of block 512). In the illustrative embodiment, the data storage device 150 provides (e.g., through the NIC 220 of the host compute device 110) data indicative of the adjusted configuration and performance information of the data storage device 150 (e.g., the associated speeds of the operations performed under the adjusted configuration data, data indicative of malfunctions in one or more components of the data storage device 150 such as error logs, stack traces, performance information that indicates that a component did not respond to a request within a predefined time period, etc.) to an external compute device (e.g., the manufacturer compute device 120) for analysis, as indicated in block 592. In doing so, the data storage device 150 may send the data in an encrypted format (e.g., as encrypted telemetry) to the external compute device through the network 130 (e.g., using the NIC 220), as indicated in block 594. The telemetry data may be sent in one or more of a set of telemetry packets 1100, which are described in more detail with reference to FIG. 11. Subsequently (e.g., after a predefined time period, upon request by the compute device 110, upon a reboot of the compute device 110, etc.), the method 500 may loop back to block 502 of FIG. 5 to potentially apply further configuration adjustments.

Figure 8:
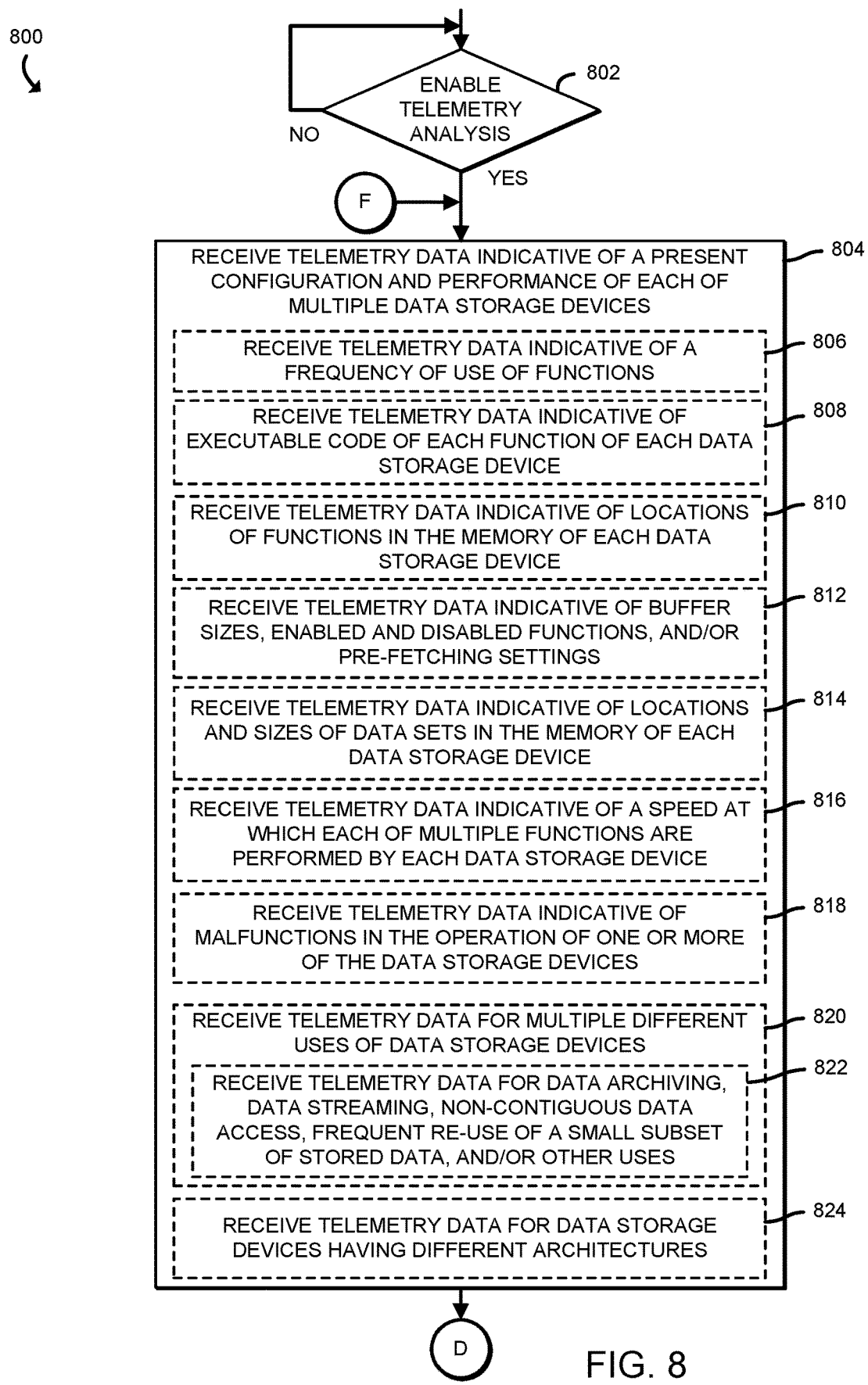
FIGS. 8-10 are a simplified block diagram of at least one embodiment of a method for adjusting, based on telemetry data, the performance of data storage devices that may be performed by the manufacturer compute device of FIG. 1.

Referring now to FIG. 8, in operation, the manufacturer compute device 120 may perform a method 800 for adjusting the performance of data storage devices (e.g., the data storage devices 150, 152) based on received telemetry data from the data storage devices. The method 800 begins with block 802 in which the manufacturer compute device 120 determines whether to enable telemetry analysis. In the illustrative embodiment, the manufacturer compute device 120 may determine to enable telemetry analysis in response to a determination that the manufacturer compute device 120 is equipped with the configuration analysis logic unit 170 and the device emulation logic unit 172. In other embodiments, the manufacturer compute device 120 may determine whether to enable telemetry analysis based on other criteria. Regardless, in response to a determination to enable telemetry analysis, the method 800 advances to block 804 in which the manufacturer compute device 120 receives telemetry data indicative of a present configuration and performance of each of multiple data storage devices (e.g., the data storage devices 150, 152). In doing so, the manufacturer compute device 120 may receive the telemetry data in a stream of telemetry packets 1100, which are described in more detail with respect to FIG. 11. While the two data storage devices 150, 152 are used herein for simplicity, it should be understood that in the illustrative embodiment, the number of data storage devices for which the manufacturer compute device 120 receives telemetry data may number in the tens, hundreds, thousands, millions, or more.

As indicated in block 806, in receiving telemetry data, the manufacturer compute device 120 may receive telemetry data indicative of a frequency with which functions of each data storage device 150, 152 have been used. Such information may be useful in identifying obsolete or superfluous features of the data storage devices 150, 152 (e.g., if those functions are never used or used less than a predefined amount). The manufacturer compute device 120 may additionally or alternatively receive telemetry data indicative of the executable code (e.g., a snapshot of the executable code) of each function of each data storage device, which may be useful in determining how instructions have been reordered, disabled, or otherwise adjusted by each data storage device 150, 152 to improve performance, as indicated in block 808. The manufacturer compute device 120 may, as indicated in block 810, receive telemetry data indicative of locations of functions in the memory of each data storage device (e.g., a topology that indicates that certain functions that are frequently used together are relatively close together in memory). In block 812, the manufacturer compute device 120 may receive telemetry data indicative of buffer sizes, enabled and disabled functions, prefetching settings, and/or other configuration settings from each data storage device 150, 152.

As indicated in block 814, the manufacturer compute device 120 may receive telemetry data indicative of locations and sizes of data sets in the memory of each data storage device (e.g., to determine whether relatively large data sets have been moved to contiguous physical locations, such as for streaming purposes, or distributed across multiple data storage devices to increase throughput for read operations). In block 816, the manufacturer compute device 120 may receive telemetry data indicative of a speed (e.g., an amount of time that elapses between initiating and completing a function) at which each of multiple functions are performed by each data storage device 150, 152 under their corresponding configurations. As indicated in block 818, the manufacturer compute device 120 may receive telemetry data indicative of malfunctions (e.g., error logs, indications that one or more components did not respond to a request within a predefined amount of time, etc.) in the operation of one or more data storage devices 150, 152. In the illustrative embodiment, as indicated in block 820, the manufacturer compute device 120 receives telemetry data for multiple different uses of the data storage devices (e.g., different use cases, which are associated with the different types of workloads 140, 142 executed in association with the corresponding data storage devices 150, 152). In doing so, the manufacturer compute device 120 may receive telemetry data associated with data archiving use cases, data streaming use cases, non-contiguous data access use cases, use cases that involve frequent re-use of a small subset of the stored data, and/or other uses of the data storage devices, as indicated in block 822. Accordingly, while one configuration may provide better performance (e.g., faster operations) for one type of use case (e.g., workload), a different configuration may provide better performance for a different use case.

Similarly, as indicated in block 824, the manufacturer compute device 120 may receive telemetry data for data storage devices having different architectures, in terms of the physical media on which the data is stored and/or in the physical components that execute the operations (e.g., processors, integrated circuits, etc.). For example, one architecture may provide a higher sustained data transfer rate while another architecture may provide a lower access time. As such, while one configuration for a particular use case provides better performance for one data storage device architecture, a different configuration for the same use case may provide better performance for a different data storage device architecture. Subsequently, the method 800 advances to block 826 of FIG. 9, in which the manufacturer compute device 120 determines, as a function of (e.g., using) the telemetry data, a replacement configuration to improve the performance of one or more of the data storage devices 150, 152 (e.g., to improve the speed at which one or more operations are performed and/or to enable a data storage device to perform one or more functions, such as accessing data, that are presently unavailable due to a malfunctioning component).

Figure 9:
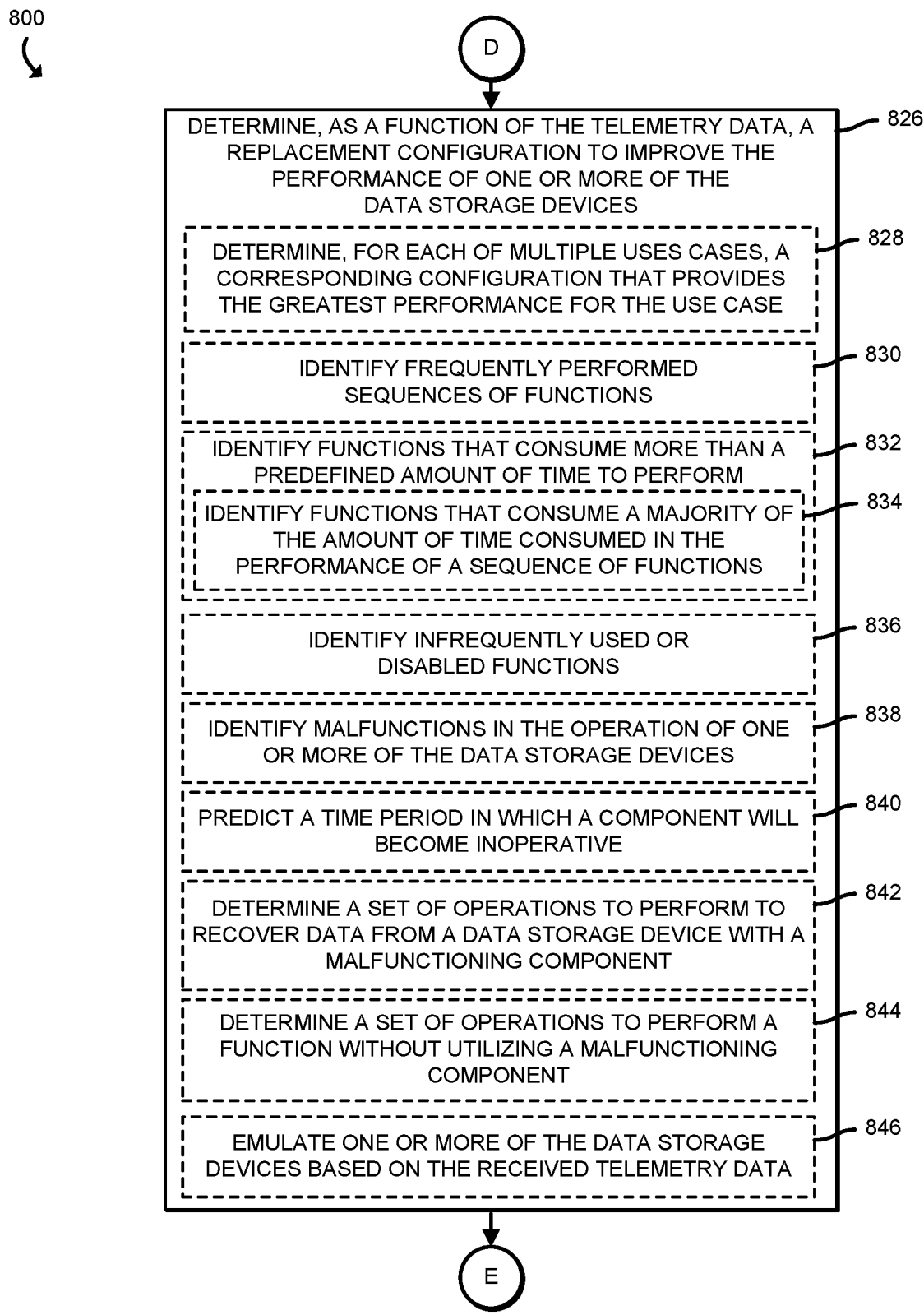

Referring now to FIG. 9, in determining the replacement configuration, the manufacturer compute device 120 may determine (e.g., select from the received configurations in the telemetry data from the various data storage devices), for each of multiple use cases (e.g., different types of workloads), a corresponding configuration that provides the greatest performance (e.g., fastest speeds), as indicated in block 828. The manufacturer compute device 120 may also identify frequently performed sequences of functions (e.g., hot paths) for each use case, as indicated in block 830. As indicated in block 832, the manufacturer compute device 120 may identify functions that consume more than a predefined amount of time to perform (e.g., bottlenecks). In doing so, the manufacturer compute device 120 may identify functions that consume the majority (e.g., more than 50% of the total time) of the time consumed in the performance of a sequence of functions (e.g., the slowest function in a hot path), as indicated in block 834. Relatedly, the manufacturer compute device 120 may identify infrequently used or disabled functions (e.g., in some configurations, a bottleneck function may be disabled because it is superfluous and adds unnecessary latency to the hot path), as indicated in block 836. In some embodiments, the manufacturer compute device 120 may identify, from the telemetry data, malfunctions in components of the data storage devices 150, 152 (e.g., from error logs), as indicated in block 838.

As indicated in block 840, the manufacturer compute device 120 may predict a time period in which a component will become inoperative (e.g., based on historical telemetry data in which certain performance trends correlate with the impending failure of a component). The manufacturer compute device 120 may determine a set of operations to perform to recover data from a data storage device that has a malfunctioning component, as indicated in block 842. For example, and as indicated in block 844, the manufacturer compute device 120 may determine a set of operations to perform a function (e.g., to read a data set) without utilizing a particular component that is malfunctioning (e.g., disabling a failed decryption ASIC and reading the data in its encrypted form). In doing so, the manufacturer compute device 120 may maintain a data structure (e.g., a database in memory) of known malfunctions and known solutions, and match a given malfunction indicated in the telemetry data to the set of known malfunctions to identify the corresponding solution. As indicated in block 846, the manufacturer compute device 120 may emulate the malfunctioning data storage device (e.g., using the device emulation logic unit 172 and the received configuration data from blocks 806 through 814) to enable support staff to evaluate the data storage device and determine a solution without requiring the customer to physically ship the actual data storage device to the manufacturer. Subsequently, the method 800 advances to block 848 of FIG. 10, in which the manufacturer compute device 120 sends responsive data that is usable by a recipient device (e.g., one or more of the data storage devices 150, 152 and or their host compute devices 110, 112) to improve the performance of one or more of the data storage devices. In doing so, the manufacturer compute device 120 may send the responsive data in a set of (e.g., one or more) telemetry packets 1100, described in more detail with respect to FIG. 11.

Figure 10:
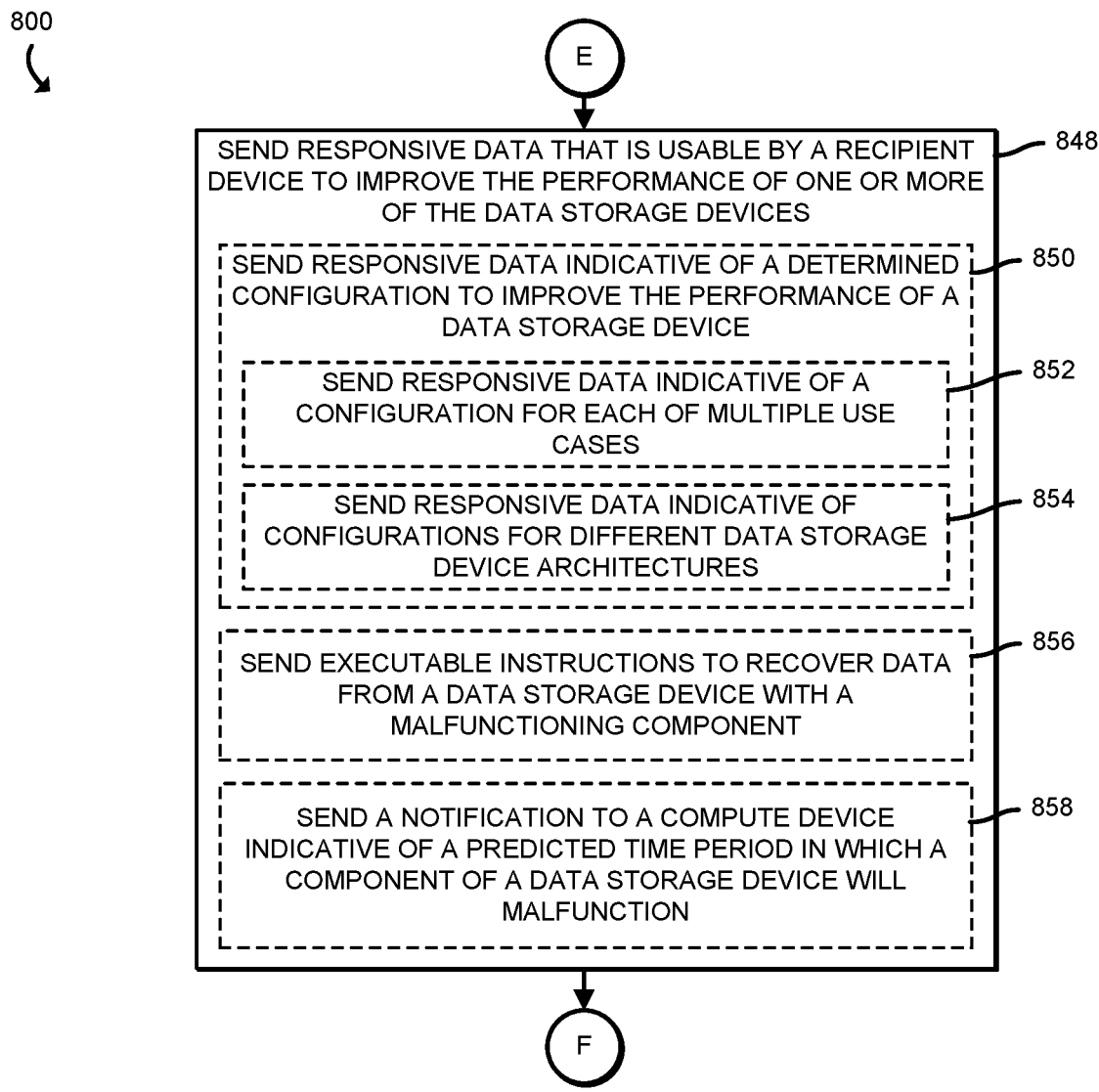

Referring now to FIG. 10, in sending the responsive data, the manufacturer compute device 120 may send responsive data indicative of a determined configuration to improve the performance of a data storage device, as indicated in block 850. In doing so, the manufacturer compute device 120 may send responsive data indicative of a configuration for each of multiple use cases (e.g., different types of workloads), as indicated in block 852. The manufacturer compute device 120 may also send responsive data indicative of configurations for different data storage device architectures, as indicated in block 854. In some embodiments, the manufacturer compute device 120 may send executable instructions usable to recover data from a data storage device with a malfunctioning component (e.g., instructions defining the set of operations determined in blocks 842 and 844), as indicated in block 856. Additionally or alternatively, the manufacturer compute device 120 may send a notification to a compute device that indicates a predicted time period in which a component of a data storage device will malfunction (e.g., the time period predicted in block 840 of FIG. 9), as indicated in block 858. Subsequently, the method 800 loops back to block 804, in which the manufacturer compute device 120 receives further telemetry data. While the blocks of the method 800 are shown in sequence, it should be understood that the blocks may be executed concurrently (e.g., the manufacturer compute device 120 may determine a replacement configuration for one or more data storage devices while concurrently receiving telemetry data from one or more data storage devices).

Figure 11:
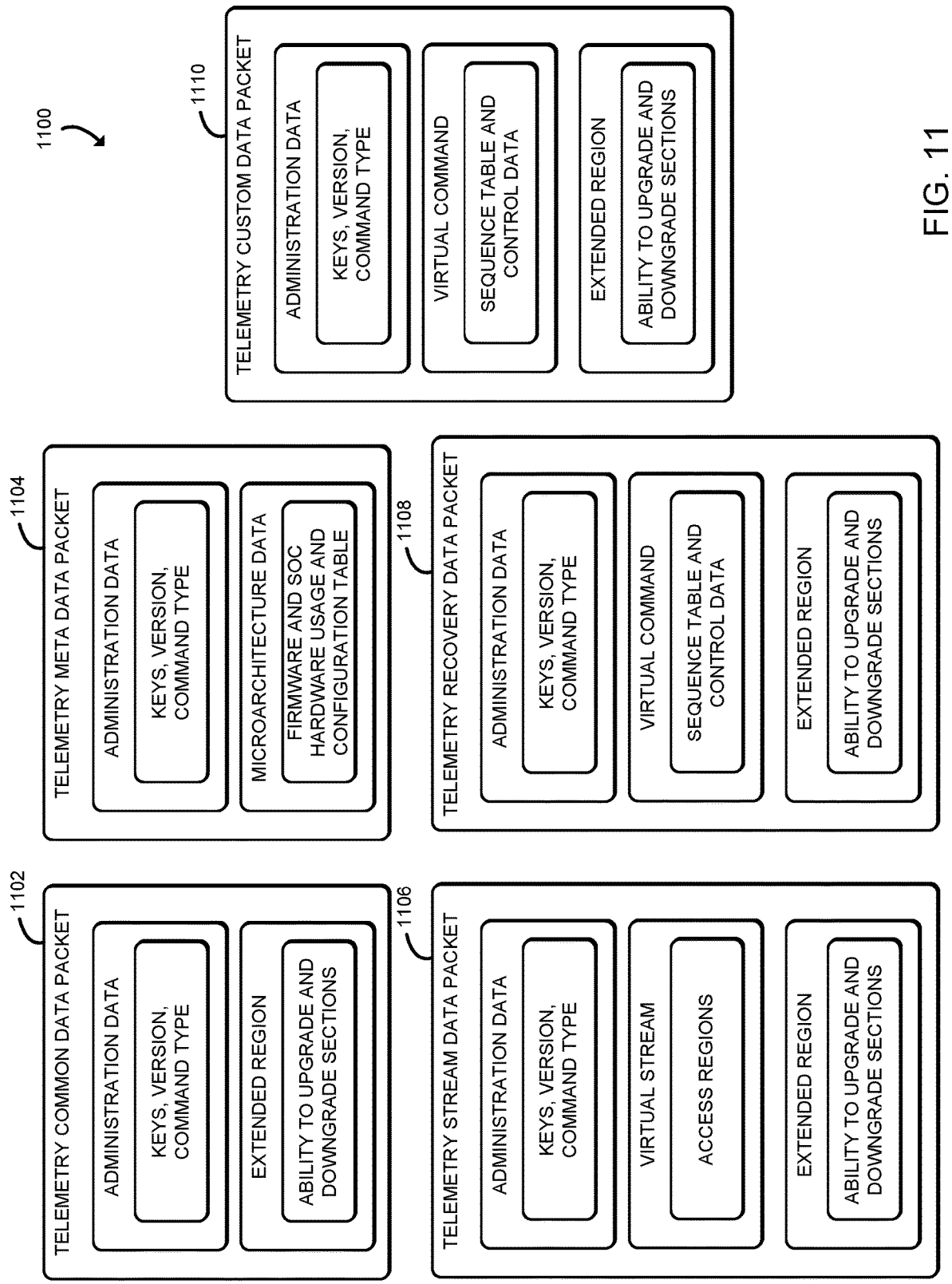
FIG. 11 is a simplified block diagram of embodiments of telemetry packets that may be used to communicate data between data storage devices and the manufacturer compute device of FIG. 1.

Referring now to FIG. 11, the data storage devices 150, 152 may communicate with the manufacturer compute device 120 through telemetry packets 1100, as referenced above in the description of the methods 500, 800. Each telemetry packet 1100 may be embodied as a common data packet 1102, a meta data packet 1104, a streaming data packet 1106, a control recovery packet 1108, or a custom operation packet 1110. The packets 1100 may include keys, such as a product key (e.g., a unique identifier to note the product family, model, configuration, and serial number to be used to decrypt private information from the manufacturer) and/or a security key (e.g., a key that is usable to encrypt and/or decrypt data). The packets 1100 may also include version control information. For example, as the firmware of a data storage device 150, 152 matures over time, different iterations of the firmware may be identified with a version number. The packets 1100 may also include access type data, which may be embodied as any data usable for identification, administration, meta data acquisition accessor, mutator, enhanced failure analysis mode, and custom extensible commands. The packets 1100 may also support streaming, such as payloads of contiguous data for failure triage, snapshots, and/or customer optimizations through virtual memory mapping of all data associated with a given data storage device 150, 152. The packets 1100 may also support streaming of performance traces indicative of hot paths (e.g., frequently executed sequences of functions). The packets 1100 may additionally support the streaming of defragmentation logs (e.g., to enhance policies through updates in configurations), customer trace logs for commands (e.g., to provide detailed path analysis and functionality for evaluations of how the data storage devices 150, 152 are being used by customers), and/or host events for artificial intelligence training, learning, and adaptation (e.g., used for failure prediction, continuous improvement feedback, environment usage data, etc.). Generated control commands may trigger corresponding firmware actions, such as system load and activate actions, to update a favorable composition (e.g., a configuration of features). As described above, the data storage devices 150, 152 operate under a given configuration to determine whether that configuration is stable and provides better (e.g., faster, more reliable, etc.) performance compared to other configurations. The streaming packets may be used for continual log collection, large data extraction, and/or other custom procedures (e.g., emulating manufacturing procedures, discovery of media/systems, system quarantining, etc.). The packets 1100 also allow for the manufacturer (e.g., the manufacturer compute device 120) to provide a messaging packet once a root cause of a class of failure is identified, to encapsulate, repair, and re-enable a data storage device 150, 152. A custom data packet enables spooling of large amounts of meta data related to resolving challenges and add the ability to work around (e.g., avoid the use of) a malfunctioning component until a solution has been identified (e.g., by the manufacturer). The instruction packets, for example, may contain instructions for how to disable hardware components and/or to change the operation of components to resolve errors reported by the data storage device 150.

Examples

Illustrative examples of the technologies disclosed herein are provided below. An embodiment of the technologies may include any one or more, and any combination of, the examples described below.

Example 1 includes a compute device comprising a compute engine to receive, with communication circuitry and through a network, telemetry data indicative of a present configuration and performance of each of multiple data storage devices; determine, as a function of the received telemetry data, a replacement configuration to improve the performance of one or more of the data storage devices; and send, with the communication circuitry, responsive data that is usable by the one or more of the data storage devices to improve the performance of the one or more data storage devices.

Example 2 includes the subject matter of Example 1, and wherein to receive the telemetry data comprises to receive telemetry data associated with multiple different uses of the data storage devices or to receive telemetry data with multiple different data storage device architectures.

Example 3 includes the subject matter of any of Examples 1 and 2, and wherein to receive the telemetry data comprises to receive telemetry data indicative of a frequency of use of one or more functions of the data storage devices.

Example 4 includes the subject matter of any of Examples 1-3, and wherein to receive the telemetry data comprises to receive telemetry data indicative of executable code of each of multiple functions of the data storage devices.

Example 5 includes the subject matter of any of Examples 1-4, and wherein to receive the telemetry data comprises to receive telemetry data indicative of locations of functions in a memory of one or more of the data storage devices.

Example 6 includes the subject matter of any of Examples 1-5, and wherein to receive the telemetry data comprises to receive telemetry data indicative of a malfunction of one or more of the data storage devices.

Example 7 includes the subject matter of any of Examples 1-6, and wherein to determine a replacement configuration comprises to identify a sequence of functions that are performed with a predefined frequency and wherein the compute engine is further to identify a function in the sequence that consumes at least a predefined portion of a total amount of time consumed to perform the entire sequence of functions.

Example 8 includes the subject matter of any of Examples 1-7, and wherein to determine a replacement configuration comprises to identify, from the telemetry data, a disabled function in one configuration that provides a performance improvement over another configuration in which the function is not disabled.

Example 9 includes the subject matter of any of Examples 1-8, and wherein the compute engine is further to determine a set of operations to perform to recover data from one of the data storage devices, wherein the one of the data storage devices has a malfunctioning component; and send, with the communication circuitry, a set of executable instructions indicative of the operations to be performed by the recipient device to recover data from the data storage device that has the malfunctioning component.

Example 10 includes the subject matter of any of Examples 1-9, and wherein the compute engine is further to emulate one of the data storage devices based on the received telemetry data.

Example 11 includes the subject matter of any of Examples 1-10, and wherein to receive the telemetry data comprises to receive telemetry data indicative of at least one of a buffer size, enabled and disabled functions, or pre-fetching settings of one or more of the data storage devices.

Example 12 includes the subject matter of any of Examples 1-11, and wherein to receive the telemetry data comprises to receive telemetry data indicative of locations of data sets in a memory of each data storage device.

Example 13 includes the subject matter of any of Examples 1-12, and wherein to receive the telemetry data comprises to receive telemetry data indicative of a speed at which each of multiple functions are performed by each data storage device.

Example 14 includes the subject matter of any of Examples 1-13, and further including the communication circuitry.

Example 15 includes a method comprising receiving, by a compute device and through a network, telemetry data indicative of a present configuration and performance of each of multiple data storage devices; determining, by the compute device and as a function of the received telemetry data, a replacement configuration to improve the performance of one or more of the data storage devices; and sending, by the compute device, responsive data that is usable by one or more of the data storage devices to improve the performance of the one or more data storage devices.

Example 16 includes the subject matter of Example 15, and wherein receiving the telemetry data comprises receiving telemetry data associated with multiple different uses of the data storage devices.

Example 17 includes the subject matter of any of Examples 15 and 16, and wherein receiving the telemetry data comprises receiving telemetry data with multiple different data storage device architectures.

Example 18 includes a compute device comprising circuitry for receiving, through a network, telemetry data indicative of a present configuration and performance of each of multiple data storage devices; means for determining, as a function of the received telemetry data, a replacement configuration to improve the performance of one or more of the data storage devices; and circuitry for sending, through the network, responsive data that is usable by one or more of the data storage devices to improve the performance of the one or more data storage devices.

Example 19 includes the subject matter of Example 18, and wherein the circuitry for receiving the telemetry data comprises circuitry for receiving telemetry data associated with multiple different uses of the data storage devices or circuitry for receiving telemetry data with multiple different data storage device architectures.

Example 20 includes the subject matter of any of Examples 18 and 19, and wherein the circuitry for receiving the telemetry data comprises circuitry for receiving telemetry data indicative of a frequency of use of one or more functions of the data storage devices.

The invention claimed is:

1. A compute device comprising:
a compute engine to:
receive, with communication circuitry and through a network, telemetry data indicative of a present configuration and performance of each of multiple data storage devices, including a topology that indicates that certain functions that are frequently used together are closer together in memory;
determine, as a function of the received telemetry data, a replacement configuration to improve performance of one or more of the data storage devices; and
send, with the communication circuitry, responsive data that is usable by the one or more of the data storage devices to improve the performance of the one or more data storage devices.

2. The compute device of claim 1, wherein to receive the telemetry data comprises to receive telemetry data associated with multiple different uses of the data storage devices or to receive telemetry data with multiple different data storage device architectures.

3. The compute device of claim 1, wherein to receive the telemetry data comprises to receive telemetry data indicative of executable code of each of multiple functions of the data storage devices.

4. The compute device of claim 1, wherein to receive the telemetry data comprises to receive telemetry data indicative of a malfunction of one or more of the data storage devices.

5. The compute device of claim 1, wherein to determine a replacement configuration comprises to identify a sequence of functions that are performed with a predefined frequency and wherein the compute engine is further to identify a function in the sequence of functions that consumes at least a predefined portion of a total amount of time consumed to perform an entire sequence of functions.

6. The compute device of claim 1, wherein to determine a replacement configuration comprises to identify, from the telemetry data, a disabled function in one configuration that provides a performance improvement over another configuration in which the function is not disabled.

7. The compute device of claim 1, wherein the compute engine is further to:
determine a set of operations to perform to recover data from one of the data storage devices, wherein the one of the data storage devices has a malfunctioning component; and
send, with the communication circuitry, a set of executable instructions indicative of operations to be performed by the compute device to recover data from the data storage device that has the malfunctioning component.

8. The compute device of claim 7, wherein the compute engine is further to emulate one of the data storage devices based on the received telemetry data.

9. The compute device of claim 1, wherein to receive the telemetry data comprises to receive telemetry data indicative of at least one of a buffer size, enabled and disabled functions, or pre-fetching settings of one or more of the data storage devices.

10. The compute device of claim 1, wherein to receive the telemetry data comprises to receive telemetry data indicative of locations of data sets in a memory of each data storage device.

11. The compute device of claim 1, wherein to receive the telemetry data comprises to receive telemetry data indicative of a speed at which each of multiple functions are performed by each data storage device.

12. The compute device of claim 1, further comprising the communication circuitry.

13. A method comprising:
receiving, by a compute device and through a network, telemetry data indicative of a present configuration and performance of each of multiple data storage devices, including a topology that indicates that certain functions that are frequently used together are closer together in memory;
determining, by the compute device and as a function of the received telemetry data, a replacement configuration to improve performance of one or more of the data storage devices; and
sending, by the compute device, responsive data that is usable by one or more of the data storage devices to improve the performance of the one or more data storage devices.

14. The method of claim 13, wherein receiving the telemetry data comprises receiving telemetry data associated with multiple different uses of the data storage devices.

15. The method of claim 13, wherein receiving the telemetry data comprises receiving telemetry data with multiple different data storage device architectures.

16. A compute device comprising:
circuitry for receiving, through a network, telemetry data indicative of a present configuration and performance of each of multiple data storage devices, including a topology that indicates that certain functions that are frequently used together are closer together in memory;
means for determining, as a function of the received telemetry data, a replacement configuration to improve performance of one or more of the data storage devices; and
circuitry for sending, through the network, responsive data that is usable by one or more of the data storage devices to improve the performance of the one or more data storage devices.

17. The compute device of claim 16, wherein the circuitry for receiving the telemetry data comprises circuitry for receiving telemetry data associated with multiple different uses of the data storage devices or circuitry for receiving telemetry data with multiple different data storage device architectures.

* * * * *